(12) United States Patent
Christian et al.

(10) Patent No.: US 12,260,437 B2
(45) Date of Patent: Mar. 25, 2025

(54) EDGE PROVISIONED CONTAINERIZED TRANSACTION TAX ENGINE

(71) Applicant: Vertex, Inc., King of Prussia, PA (US)

(72) Inventors: Eric Christian, Battle Ground, WA (US); Derek Christman, Beaverton, OR (US); Bala Mariappan, Portland, OR (US)

(73) Assignee: VERTEX, INC., King Of Prussia, PA (US)

( * ) Notice: Subject to any disclaimer, the term of this patent is extended or adjusted under 35 U.S.C. 154(b) by 273 days.

(21) Appl. No.: 17/660,295

(22) Filed: Apr. 22, 2022

(65) Prior Publication Data

US 2023/0214892 A1     Jul. 6, 2023

Related U.S. Application Data

(60) Provisional application No. 63/295,488, filed on Dec. 30, 2021.

(51) Int. Cl.
| | |
|---|---|
| *G06Q 30/04* | (2012.01) |
| *G06F 9/455* | (2018.01) |
| *G06F 9/54* | (2006.01) |

(52) U.S. Cl.
CPC ......... *G06Q 30/04* (2013.01); *G06F 9/45558* (2013.01); *G06F 9/547* (2013.01); *G06F 2009/45562* (2013.01); *G06F 2009/45595* (2013.01)

(58) Field of Classification Search
CPC .. G06Q 40/123; G06Q 30/04; G06F 9/45558; G06F 9/547; G06F 2009/45562; G06F 2009/45595
See application file for complete search history.

(56) References Cited

U.S. PATENT DOCUMENTS

| | | | |
|---|---|---|---|
| 8,788,412 B1 * | 7/2014 | Hamm | G06F 16/13 705/39 |
| 11,874,826 B1 * | 1/2024 | Kavounas | G06F 16/2379 |
| 2006/0235776 A1 * | 10/2006 | Temme | G06Q 40/00 705/31 |
| 2010/0306384 A1 * | 12/2010 | Hayes | H04L 69/40 709/227 |
| 2014/0052591 A1 * | 2/2014 | Schuler | G06Q 10/06 705/30 |

(Continued)

*Primary Examiner* — Florian M Zeender
*Assistant Examiner* — Anessa Deligi
(74) *Attorney, Agent, or Firm* — Alleman Hall & Tuttle LLP

(57) ABSTRACT

A computer system includes a container deployment and management server for executing a container builder. The container builder is configured to generate and deploy a transaction tax engine container. The container builder is configured to extract from client configuration settings a subset of multiple products and a subset of multiple geographic regions applicable to transactions processed by a client, identify a subset of the tax rate and rule data applicable to each of the subset of products in each of the subset of geographic regions, and create a local edge database including the subset of tax rate and rule data and excluding a reminder of the tax rate and rule data. The container builder is further configured to create a transaction tax engine container image and transmit the tax engine container image to an edge computing device.

20 Claims, 10 Drawing Sheets

(56) References Cited

U.S. PATENT DOCUMENTS

| | | | |
|---|---|---|---|
| 2021/0026823 A1* | 1/2021 | von Rickenbach | G06F 11/0793 |
| 2021/0073019 A1* | 3/2021 | Murray | H04L 9/3239 |
| 2021/0365551 A1* | 11/2021 | Selegean | G06F 21/554 |
| 2022/0413825 A1* | 12/2022 | Bruno | G06F 8/63 |
| 2023/0188477 A1* | 6/2023 | Zeng | H04L 47/762 |
| | | | 709/218 |
| 2023/0254268 A1* | 8/2023 | Therrien | G06Q 40/10 |
| | | | 709/226 |

* cited by examiner

| RULE ID 34 | JURISDICTION 36 | EVENT 38 | CONDITION 40 | TAX ATR 42 | START DATE 44 |
|---|---|---|---|---|---|
| 150001263 | SEATTLE | SALE | 1. TAX CAT: COFFEE DRINKS | NONTAXABLE | 1/24/2022 |
| 150001264 | SEATTLE | SALE | 1. TAX CAT: RUBBER PANTS | TAXABLE | 1/24/2022 |
| 150001265 | SEATTLE | SALE | 1. TAX CAT: FOOD | EXEMPT | 1/24/2022 |
| 300961850 | SEATTLE | LEASE, RENTAL | 1. TAX CAT: AUTOMOBILES<br>2. TAX CAT: TRUCKS... | TAXABLE | 4/01/2008 |
| 300982701 | SEATTLE | SALE | 1. TAX CAT: ADMISSION TO AMUSEMENT ... | TAXABLE | 4/01/2011 |
| 301000291 | SEATTLE | SALE | 1. TAX CAT: LATE FEES<br>2. TAX CAT: CONVENIENCE FEES... | TAXABLE | 6/01/2013 |

| PRODUCTS 52 | PRODUCT NAME 60 | TAXPAYER 58 | START DATE 62 | END DATE 64 |
|---|---|---|---|---|
| BAGEL | BAGEL | RETAILCONYC | 1/24/2022 | NO END DATE |
| CANNOLI | CANNOLI | RETAILCONYC | 1/24/2022 | NO END DATE |
| COFFEE | COFFEE | RETAILCOSEA | 1/24/2022 | NO END DATE |
| PIZZA | PIZZA | RETAILCONYC | 1/24/2022 | NO END DATE |
| RAINGEAR | RAINGEAR | RETAILCOSEA | 1/24/2022 | NO END DATE |
| SALMON | SALMON | RETAILCOSEA | 1/24/2022 | NO END DATE |

| ENTITY | PRODUCT 52 | TAXPAYER 58 | TAXABLE CATEGORY 66 | START DATE 62 | END DATE 64 |
|---|---|---|---|---|---|
| RAINGEAR | RAINGEAR | RETAILCOSEA | RUBBER PANTS | 1/24/2022 | NO END DATE |

70

| ENTITY | PRODUCT 52 | TAXPAYER 58 | TAXABLE CATEGORY 66 | START DATE 62 | END DATE 64 |
|---|---|---|---|---|---|
| SALMON | SALMON | RETAILCOSEA | FOOD | 1/24/2022 | NO END DATE |

FIG. 4

| RULE ID 34 | JURISDICTION 36 | EVENT 38 | CONDITION 40 | TAX ATR 42 | START DATE 44 |
|---|---|---|---|---|---|
| 150001263 | SEATTLE | SALE | 1. TAX CAT: COFFEE DRINKS | NONTAXABLE | 1/24/2022 |
| 150001264 | SEATTLE | SALE | 1. TAX CAT: RUBBER PANTS | TAXABLE | 1/24/2022 |
| 150001265 | SEATTLE | SALE | 1. TAX CAT: FOOD | EXEMPT | 1/24/2022 |

EDGE PROVISIONED CONTAINERIZED TRANSACTION TAX ENGINE

CROSS REFERENCE TO RELATED APPLICATIONS

The present application is based upon and claims priority under 35 U.S.C. 119(e) to U.S. Provisional Patent Application No. 63/295,488, entitled EDGE PROVISIONED CONTAINERIZED TRANSITION TAX ENGINE, filed Dec. 30, 2021, the entirety of which is hereby incorporated herein by reference for all purposes.

BACKGROUND

Transaction tax engines are used to calculate taxes applicable to transactions for goods and services at locations around the world. Tax rules around the world are complicated and changing, and cloud service providers have emerged that offer transaction tax calculation as a service in the cloud. To calculate tax for a transaction occurring at a point-of-sale device or e-commerce server, the point-of-sale device or server sends a request for a transaction tax calculation to a transaction tax engine provisioned in the cloud by the cloud service provider. While such an approach offers the convenience of offloading the complex tax calculation to a third-party specialist, drawbacks exist to such an approach. For example, when Internet connectivity goes down between the client and the transaction tax engine, tax cannot be calculated. This could result in transactions not being consummated, or as is more typical, tax not being charged on the transaction at the time of the transaction, but nonetheless later being owed by the company. Another drawback is the increased latency introduced into the transaction by the need to query the transaction tax engine. This can cause delays that can frustrate the purchaser, possibly resulting in lost sales through abandoned e-commerce shopping carts, etc.

SUMMARY

To address the above issues, a computer system is provided that implements an edge provisioned containerized transaction tax engine. The computer system has server-side and client-side aspects. According to one aspect, the computing system includes a container builder configured to generate and deploy a transaction tax engine container. The container builder is configured to extract from client configuration settings at a transaction tax server having an associated tax rules database including tax rate and rule data for multiple products and multiple geographic regions, a subset of the multiple products and a subset of the multiple geographic regions applicable to transactions processed by a client. The container builder is further configured to identify a subset of the tax rate and rule data applicable to each of the subset of products in each of the subset of geographic regions, and create a local edge database including the subset of tax rate and rule data and excluding a remainder of the tax rate and rule data. The container builder is further configured to create a transaction tax engine container image including the local edge database, along with an edge version of a tax calculation engine, and transmit the transaction tax engine container image to an edge computing device. Other aspects of the system are described below.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows example tax rate and rule data used by a transaction tax engine of the computing system of FIG. 1.

FIG. 3 shows example taxability drivers of a client-specified selection of a subset of products in client configuration settings of the computing system of FIG. 1.

FIG. 4 shows example mappings between the client-specified products in FIG. 3 to a taxability category.

FIG. 5 shows an example subset of tax rate and rule data applicable to the client-specified selection of a subset of products illustrated in FIG. 3.

DETAILED DESCRIPTION

Figure 1:
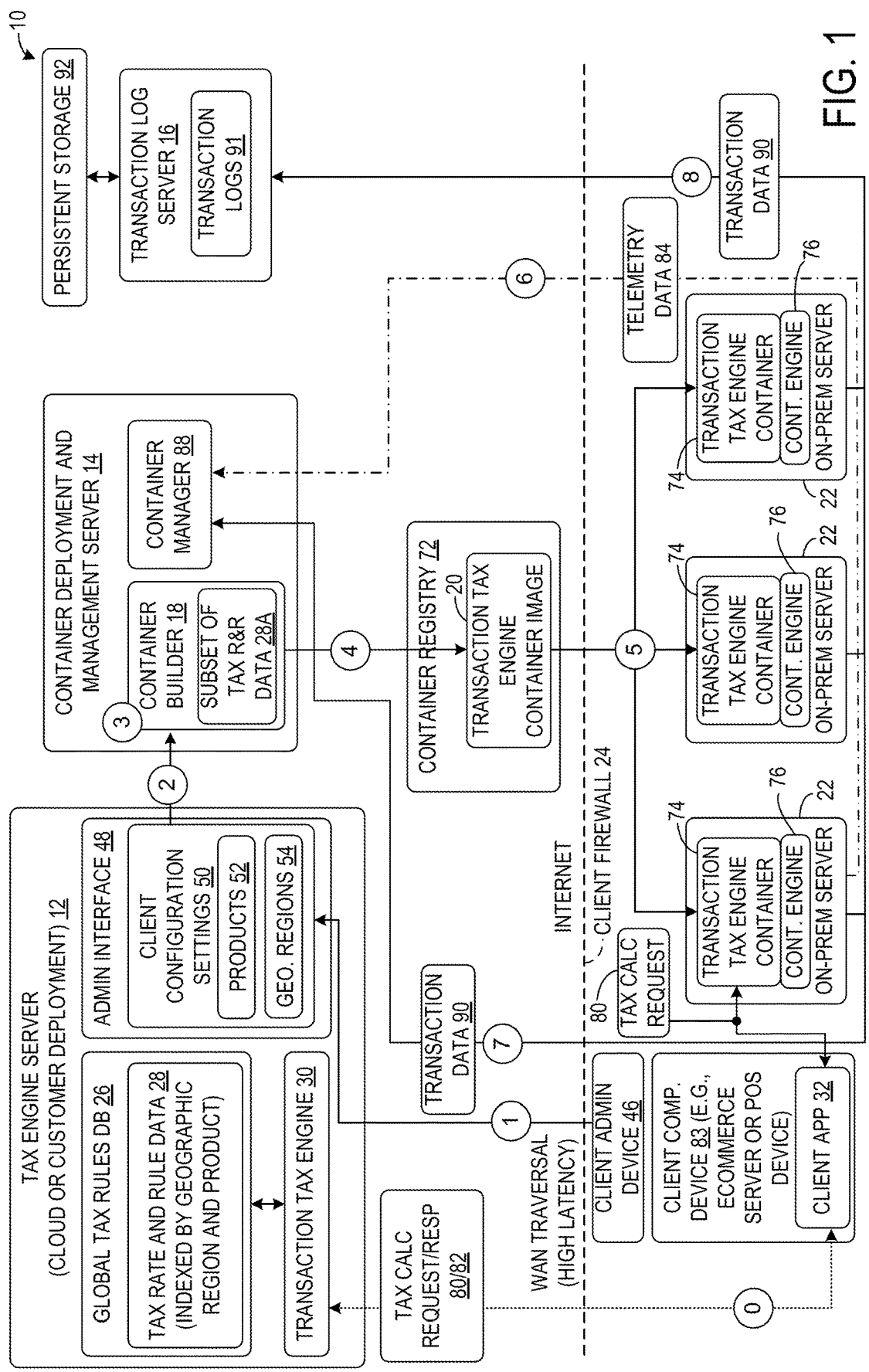
FIG. 1 shows a schematic view of a computing system according to one example of the present disclosure.

To address the above issues, a computing system 10 is provided, as shown schematically in FIG. 1. The computing system 10 includes a tax engine server 12, a container deployment and management server 14, and a transaction log server 16, each of which may be hosted in a data center of a tax platform operator, for example. Alternatively, the tax engine server 12, container deployment and management server 14, and transaction log server 16 may be configured by the tax platform operator to be hosted at a client-specified data center under control of the client, for performance, security, privacy, and/or export compliance reasons, for example.

Computing system 10 includes a container builder 18 executed by a processor of the container deployment and management server 14 and configured to generate a transaction tax engine container image 20 that may be deployed at a plurality of on-premises servers 22 of a client, located at a respective plurality of different geographic locations. The on-premises servers 22 at the plurality of locations are logically behind a client firewall 24 that monitors and selectively allows or blocks networking communications to and from the computers situated on the client-side of the firewall, based on a set of security policies.

The tax engine server 12 has an associated global tax rules database 26 that includes tax rate and rule data 28 including tax rates and rules for multiple products and multiple geographic regions for a global list of geographic regions and a global list of products. The tax rates and rules can be indexed by geographic region and product. The tax engine server 12 further includes a cloud-based transaction tax engine 30 that is configured to receive a tax calculation request including, for example, a client identifier, product identifier, geographic region identifier, and amount, from a plurality of client applications 32. The transaction tax engine 30 is configured to calculate an applicable tax burden (amount or rate) for the transaction in response to receiving the transaction data, and reply by transmitting the applicable tax burden to the requesting client application 32. The applicable burden can be determined from applicable tax rules in the tax rate and rule data 28. The communications between transaction tax engine 30 and the client application 32 as illustrated at (0) traverse the Internet, and thus are subject to high latency and the attendant issues described above.

It will be appreciated that the global tax rules database 26 and transaction tax engine 30 require significant memory requirements due to their large size, and also require deployment on servers that are scalable to address spikes in demand, and also have high availability (e.g., low downtime), and require continuous updating as the tax rules of the various geographic regions around the world change. For these reasons, the tax engine server 12 is often centrally hosted in a data center of a cloud computing service that offers its platform as a service. However, central hosting in a data center in this manner, as described above, increases transaction latency and bandwidth requirements for the client, and also increases the risk of downtime or failed tax calculation requests when network connectivity from client applications to the data center servers is lost. To address these issues, computing system 10 utilizes containerization, deployment, and management of a compact and client-localized version of the transaction tax engine 30 at each client's edge computing devices, as describe below.

An example of the tax rate and rule data 28 is shown in FIG. 2. The tax rate and rule data 28 includes a rule identification (ID) 34, a jurisdiction 36, an event 38, a condition 40, a tax attribute (ATR) 42, a start date 44, and/or any other suitable information. The rule ID 34 is an identifier for an individual tax rule and can be numeric or any suitable alphanumeric sequence. The jurisdiction 36 corresponds to a geographical area where a transaction occurs. The event 38 includes information relating to the nature of the transaction, such as sale, lease, or rental as examples. The condition 40 indicates a taxable category associated with the rule ID 34. The taxable category can be used to determine an applicable tax rate or rule of the transaction. The tax attribute 42 indicates how to tax the taxable category, such as taxable, nontaxable, exempt, as examples. When the tax attribute 42 is taxable, the tax rule has an associated amount or rate (i.e., fee) which can be an actual rate or fee or can be an indicator that a standard rate of the jurisdiction 36 is to be applied. The start date 44 can indicate a date to start applying the rule ID 34. FIG. 2 shows a portion of the tax rate and rule data for a single jurisdiction, the city of Seattle, in the tax and rule data 28.

Returning to FIG. 1, as illustrated at (1), the client may utilize a client administrative device 46 to access an administrative interface 48 of the tax engine server 12 and upload client configuration settings 50 to the server 12. The client configuration settings 50 may include, for example, a client-specified selection of a subset of products 52 involved in the transactions, selected from among a global list of products stored at the tax engine server 12. Here, "products" means tangible and intangible products and service offerings, e.g., both goods and services that may be subject to transaction taxes, such as sales and use tax, lodging and occupancy tax, etc. The client configuration settings 50 also may include, for example, a client-specified subset of geographic regions 54 in which the transactions take place or that govern the transactions due to the location at which they are legally deemed to take place (in the case of an online transaction, for example), which have been selected from among a global list of geographic regions stored at the tax engine server 12. The client configuration settings 38 may further include information on tax exemptions in rule and rate data 28 that apply to transactions.

FIG. 3 shows example taxability drivers 56 of a client-specified selection of a subset of products 52 involved in the transactions for an example client RetailCo. In this example, RetailCo has two taxpayer entities 58, RetailCoNYC, with transactions taking place in New York City, and RetailCo-SEA with transactions taking place in the city of Seattle. Each taxpayer entity 58 has an associated subset of products 52 each with a product name 60. Further, a start date 62 and an end date 64 can be set for each of the products 52. Each product 52 is mapped to a taxable category 66 as shown in FIG. 4. The taxable categories 66 are predefined groups that help to drive the selection of one or more tax rules in the tax rate and rule database 28 for each geographical area. In the RetailCo example, the product 52 raingear for the taxpayer 58 RetailCoSEA is mapped to the taxable category 66 of rubber pants as indicated at 68, and the product 52 salmon is mapped to the taxable category 66 of food as indicated at 70. The list of the taxability drivers 56 and the mappings 68, 70 are examples of components of the client configuration settings 50.

Returning to FIG. 1, the container builder 18 is executed by the container deployment and management server 14 or by any suitable server. As shown at (2), the container builder 18 is configured to extract from the client configuration settings 50 at the tax engine server 12 having the associated tax rules database 26 including tax rate and rule data 28 for multiple products and multiple geographic regions, and a subset of the multiple products and a subset of the multiple geographic regions applicable to transactions processed by the client. The container builder 18 is further configured to identify a subset of the tax rate and rule data 28A applicable to each of the subset of products in each of the subset of geographic regions 54, as shown at (3). This may be accomplished, for example, by querying the tax rules database 26 for the subset of tax rate and rule data. The container builder 18 is further configured to create a local edge database including the subset of tax rate and rule data 28A and excluding a remainder of the tax rate and rule data. An example subset of the tax rate and rule data 28A pertaining to the above example taxpayer RetailCoSEA is shown in FIG. 5.

Figure 6:
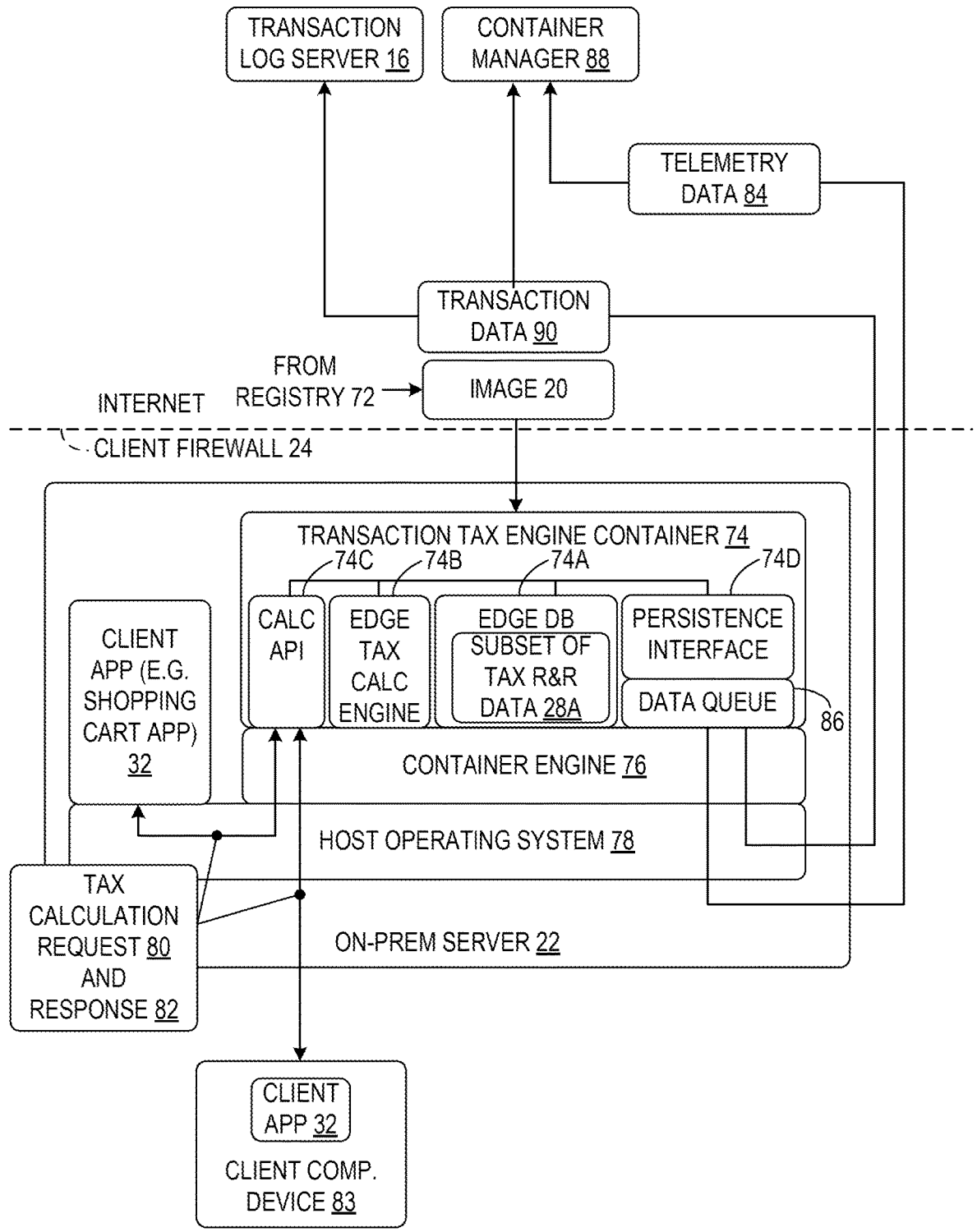
FIG. 6 shows a detailed schematic view of a transaction tax engine container of FIG. 1, implemented at least partially on an on-premises server of a client.

As shown at (4) in FIG. 1, the container builder 18 is further configured to create a transaction tax engine container image 20 and push the image 20 to a container registry 72. Referring now to FIG. 6, the transaction tax engine container image 20 includes files corresponding to the local edge database 74A, an edge version of a tax calculation engine 74B, a calculation application programming interface (API) 74C for the tax calculation engine, a persistence interface 74D to facilitate communication between the local edge database 74A and the edge tax calculation engine 74B, and a container engine 76 configured to enable communication between the applications executed (e.g., the transaction tax engine container 74) in a container environment and a host operating system 78. The local edge database 74A can be configured to be an in-memory database upon deployment of the container 74 at edge computing devices, such as on-premises servers 22. It will be appreciated that image 20 contains files corresponding to these components but is not instantiated as a container and thus has no state. FIG. 6 shows these components instantiated as a container on the on-premises server 22 after being received from the container registry 72. Returning to FIG. 1, the container builder 18 is further configured to transmit the transaction tax engine container image 20 to an edge computing device of the client, such as the on-premises servers 22. This may be accomplished using the container registry 72, which is configured to receive the built transaction tax engine container image 20 from the container builder 18 and, as shown at (5), deploy the transaction tax engine container image 20 on each of the destination devices, e.g., on each of the on-premises servers 22. Suitable container registries include DOCKER HUB, AMAZON ELASTIC CONTAINER REGISTRY, AZURE CONTAINER REGISTRY, JFROG, and the like.

Once deployed, the transaction tax engine container images 20 are instantiated on each of the on-premises servers 22, to thereby create container instances for each of the transaction tax engine containers 74 and associated container engines 76 executed on each server 22. As shown in FIG. 6, once instantiated, the calculation API 74C of each transaction tax engine container 74 is configured to receive API calls such as tax calculation requests 80 through communications mechanisms provided by the host operating system 78, from client applications 32, such as a shopping cart application, a point-of-sale terminal application, or other transaction software. These API calls may include tax calculation request 80 to compute a tax burden (amount or rate) for a particular product for a given geographic region. The edge tax calculation engine 74B is configured to receive those API calls from the calculation API 74C, and process them using the subset of tax rate and rule data 28A stored in the local edge database 74A, and send a tax calculation response 82 with the applicable tax amount or rate (e.g., as a computed cost or percentage of the transaction). Further in FIG. 6, one example of the client application 32 is shown executed on the on-premises server 22, which may be the same or a different server of the client executing the transaction tax engine containers 74. Another example of the client application 32 is executed on a client computing device 83 behind the client firewall 24, which for example may be a point-of-sale device. In the depicted example, the communications between the client application 32 and calculation API 74C occurs on a low latency connection such as a local area network (LAN), and thus is typically faster than communications that traverse the public Internet, such as if the client computing devices made tax calculation requests to the tax engine server 12 shown at (0) in FIG. 1.

Continuing with FIG. 6, the persistence interface 74D is configured with a communications stack configured to send telemetry data 84 through data queue 86 to a container manager 88 executed at the container deployment and management server 14, also illustrated at (6) in FIG. 1. The telemetry data 84 may include data relating to central processing unit (CPU) usage, memory usage, and transaction performance data such as completion rates and failure rates. The persistence interface 74D is also configured to send transaction data 90 via the data queue 86 to the container manager 88, and accordingly the container manager 88 of computer system 10 is configured to receive telemetry data 84 from the persistence interface 74D of the transaction tax engine container 74 executed on the edge computing device, as illustrated at (7) in FIG. 1. The persistence interface 74D is also configured to send to the transaction log server 16 the transaction data 90 via the data queue 86, also illustrated at (8) in FIG. 1. The transaction log server 16 is configured to store the transaction data 90 in transaction logs 91 in persistent storage 92, illustrated in FIG. 1.

Figure 7:
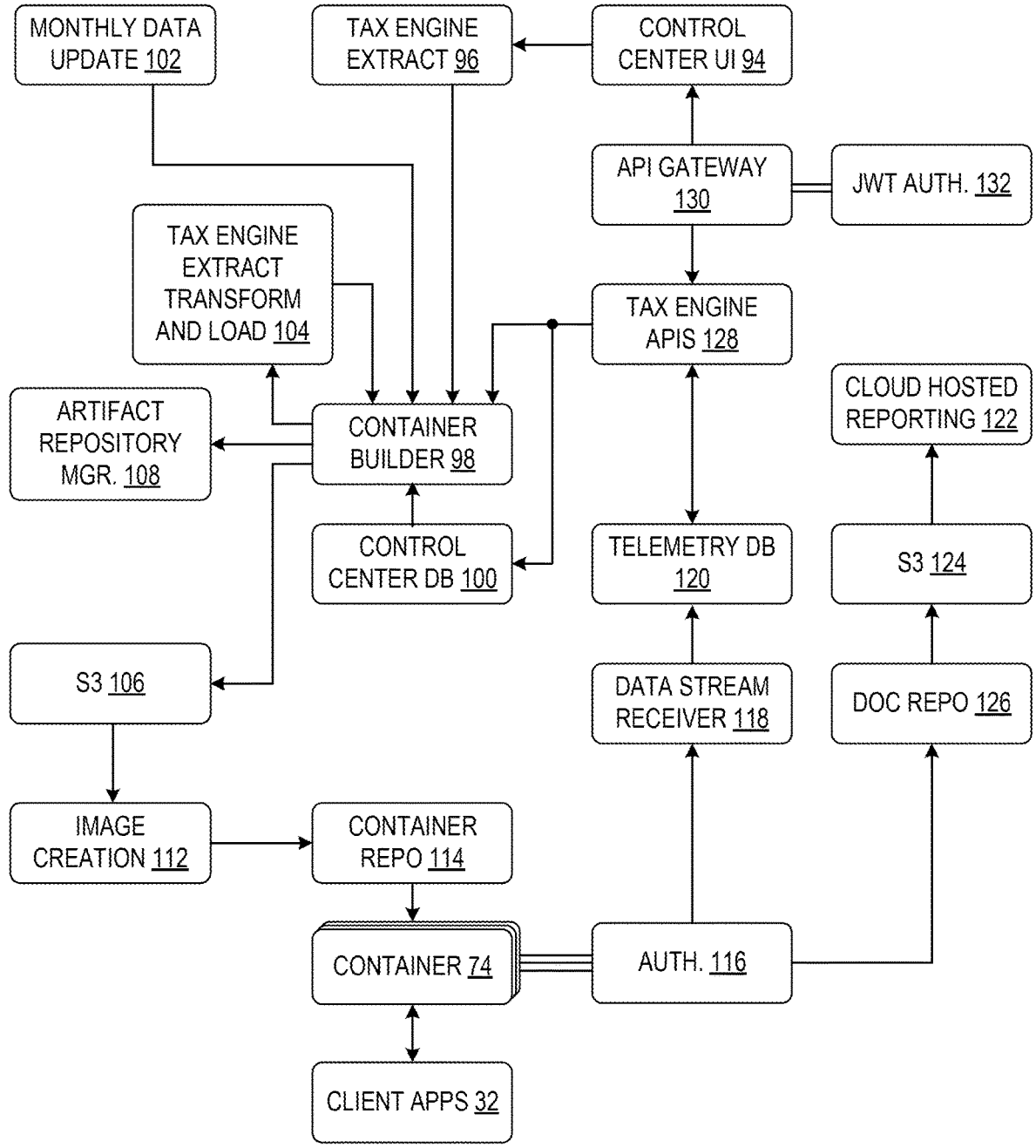
FIG. 7 shows an alternate view of the computing system of FIG. 1 illustrating communication flows between various functional software modules.

An alternate view of computing system 10 showing communication flows between various functional software modules is shown in FIG. 7. Computing system 10 includes a control center user interface (UI) 94 where a client can define the client configuration settings for provisioning the transaction tax engine containers. As previously discussed, the client configuration settings may include a subset of products and a subset of geographical regions applicable to the transactions of the client. The control center UI 94 also provides the client configuration settings to a tax engine extract 96 configured to extract taxability information from a transaction tax engine hosted on a server, such as tax engine server 12, for an edge version of the transaction tax engine.

Computing system 10 further includes a container builder 98 configured to combine content and software components used for provisioning a transaction tax engine container image. The content component can include the client configuration settings downloaded from a control center database (DB) 100, and a subset of tax rate and rule data applicable to the client-specified products and geographic areas downloaded from a monthly data update (MDU) 102. The tax rate and rule data in the monthly data update 102 can be published monthly to reflect changes in the tax rate and rule data, or at any other suitable interval. The software component can include the extracted taxability information from the tax engine extract 96. Further, the container builder 98, via a tax engine extract transform and load 104, combines and compiles the content and software components to create a transaction tax engine container image which is then uploaded to a S3 106. The transaction tax engine container image can be versioned. Further, the container builder 98 can send binary data relating to the creation of the transaction tax engine container image to artifact repository manager 108. The S3 106 is configured as a staging area for storage of the transaction tax engine container images. The binary data, artifacts, and/or container images stored in S3 bucket 106 can be copied to a container repository specified by the client. These commercially available repositories include AWS ELASTIC CONTAINER REGISTRY (ECR), DockerHub, JFROG and the like.

The transaction tax engine container image, via an image creation 112, are copied from the S3 106 to a container repository 114 configured to make available a transaction tax engine container for deployment on a client system, such as on-premises servers 22. Suitable container repositories include DOCKER HUB, AWS ELASTIC CONTAINER REPOSITORY (ECR), JFROG, and the like. Deployed transaction tax engine containers 74 are configured to provide the edge version of the transaction tax calculation engine for client applications 32 as previously discussed. Further, an update can be accomplished by swapping out one or more of the deployed tax engine containers 74 with an updated transaction tax engine container. The control center UI 94 can be used to initiate the update which can be created manually or automatically based on a client-defined schedule or through detection of configuration changes in the transaction tax engine.

The deployed transaction tax engine containers 74 are configured to send telemetry data and/or transaction data to an authorization module 116 configured to ensure encryption levels and that the data are authorized, such as via validation of a JSON web token (JWT) for example. The authorized telemetry data is sent to a data stream receiver 118, such as a KINESIS STREAMS. The data stream receiver 118 is configured to help persist telemetry data into a telemetry database 120 where the telemetry data then can be viewed through the control center UI 94. The telemetry data can include metrics such as CPU utilization or transaction performance, as examples. The authorized transaction data is sent to a cloud hosted reporting 122 via a S3 124 and a document repository 126 configured to receive and manage the transaction data for the cloud hosted reporting 122. The cloud hosted reporting 122 is configured to consolidate the transaction data which can be used for reporting, such as preparations for tax returns of the client. Alternatively, the client can use a custom solution instead of the cloud hosted reporting 122.

Computing system 10 further includes tax engine APIs 128 configured to help support functionality and/or communication between the control center UI 94 and various services and/or components of the computing system 10, such as the container builder 98, the S3 106, the S3 124, and the local edge databases of the containers 74. Further, an API gateway 130 is configured to ensure encryption levels and messages are authorized between the control center UI 94 and the tax engine APIs 128. The messages are authorized via the validation of a JWT token through JWT authorizer 132 or through any suitable authorization scheme.

Figure 8:
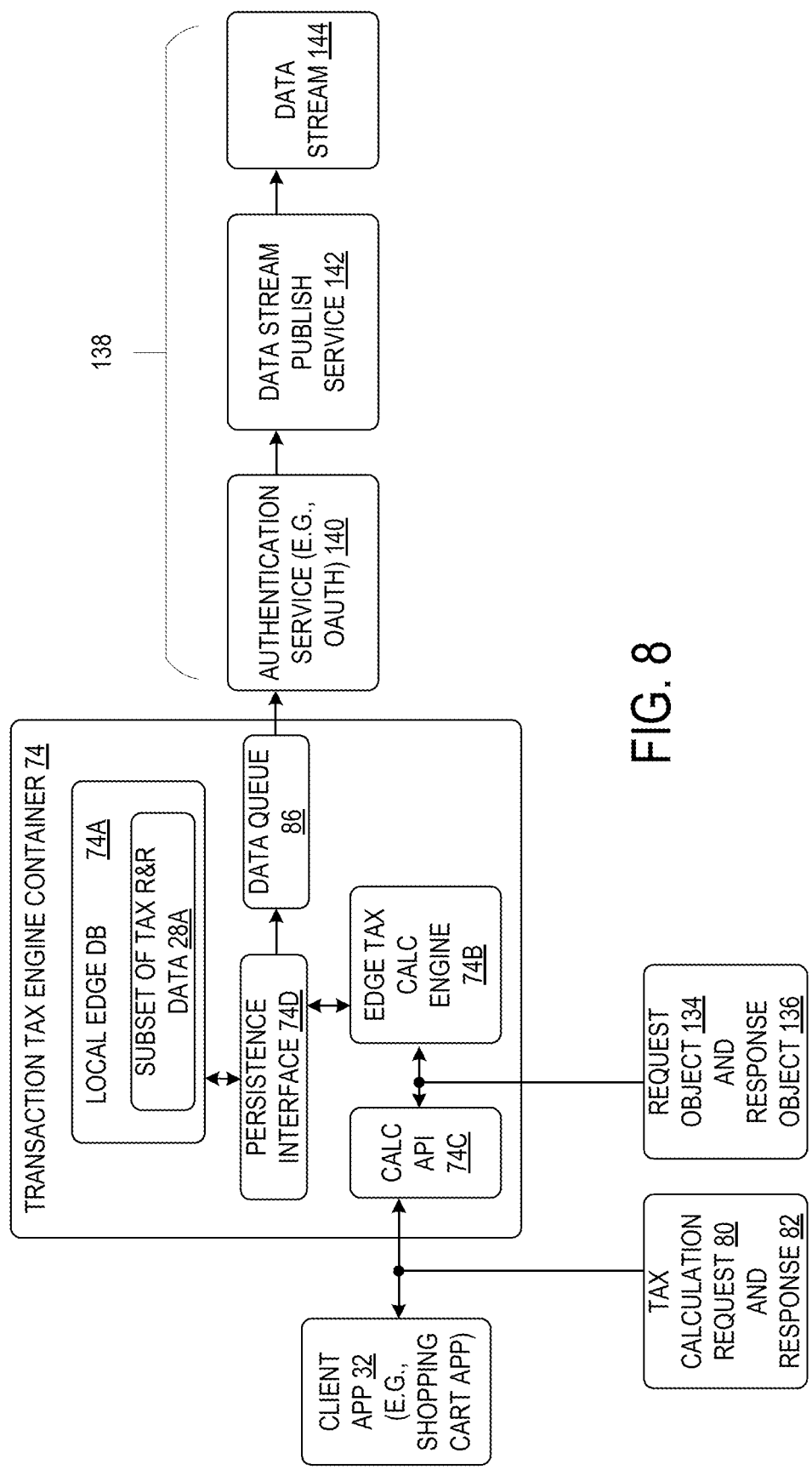
FIG. 8 shows a schematic view of the transaction tax engine container of FIGS. 1 and 6, showing communications with a client application and export of a data stream.

FIG. 8 illustrates a data flow originating with the tax calculation request 80 from the client application 32 that are processed by the transaction tax engine container 74. The calculation API 74C is configured to receive and respond to the tax calculation request 80 including information relating to the transaction at the client application 32 (e.g., a date of the transaction, a product being purchased or sold, quantities, amounts, or geographic area). Suitable example formats of the tax calculation request include objects in a SOAP or REST format and the like. Further, the calculation API 74C is configured to translate the tax calculation request 80 into a request object 134 which is passed on to the edge tax calculation engine 74B for processing. The persistence interface 74D is configured to provide an interface for the edge tax calculation engine 74B to retrieve from the subset of tax rate and rule data 28A stored in the local edge database 74A applicable tax rate and rule data to process the request object 134 based on the product(s) and geographic area of the tax calculation request 80.

The edge tax calculation engine 74B is configured to determine taxes applicable for the tax calculation request 80 by receiving the request object 134 from the calculation API 74C and using the applicable tax rate and rule data received from the persistence interface 74D. More specifically, a combination of a geographic area, a product, and rate and rule data are all mapped together to calculate tax amount and/or tax rate and format a response object 136 to return to the calculation API 74C. In the RetailCoSEA example, the edge tax calculation engine 74B will combine the geographic area of Seattle with the product of coffee and then look up the jurisdictions for Seattle, find all the tax rules applicable for the product of coffee, select the applicable tax rule, and calculate the tax burden (amount or rate). The tax calculation response 82 is sent back to the requesting client application 32 through the calculation API 74C based on the response object 136 received at the calculation API 74C.

The persistence interface 74D is further configured to send telemetry data 84 and/or transaction data 90 through the data queue 86 to the container manager 88 of the container deployment and management server 14 and/or the transaction log server 16 through a streaming data pipeline 138. The streaming data pipeline 138 includes an authentication service 140 such as OAUTH that authenticates the stream, a data stream publishing service 142 such as AWS KINESIS, which publishes a data stream 144, which can be monitored by an event-based monitoring services such as AWS LAMDA.

Figure 9A:
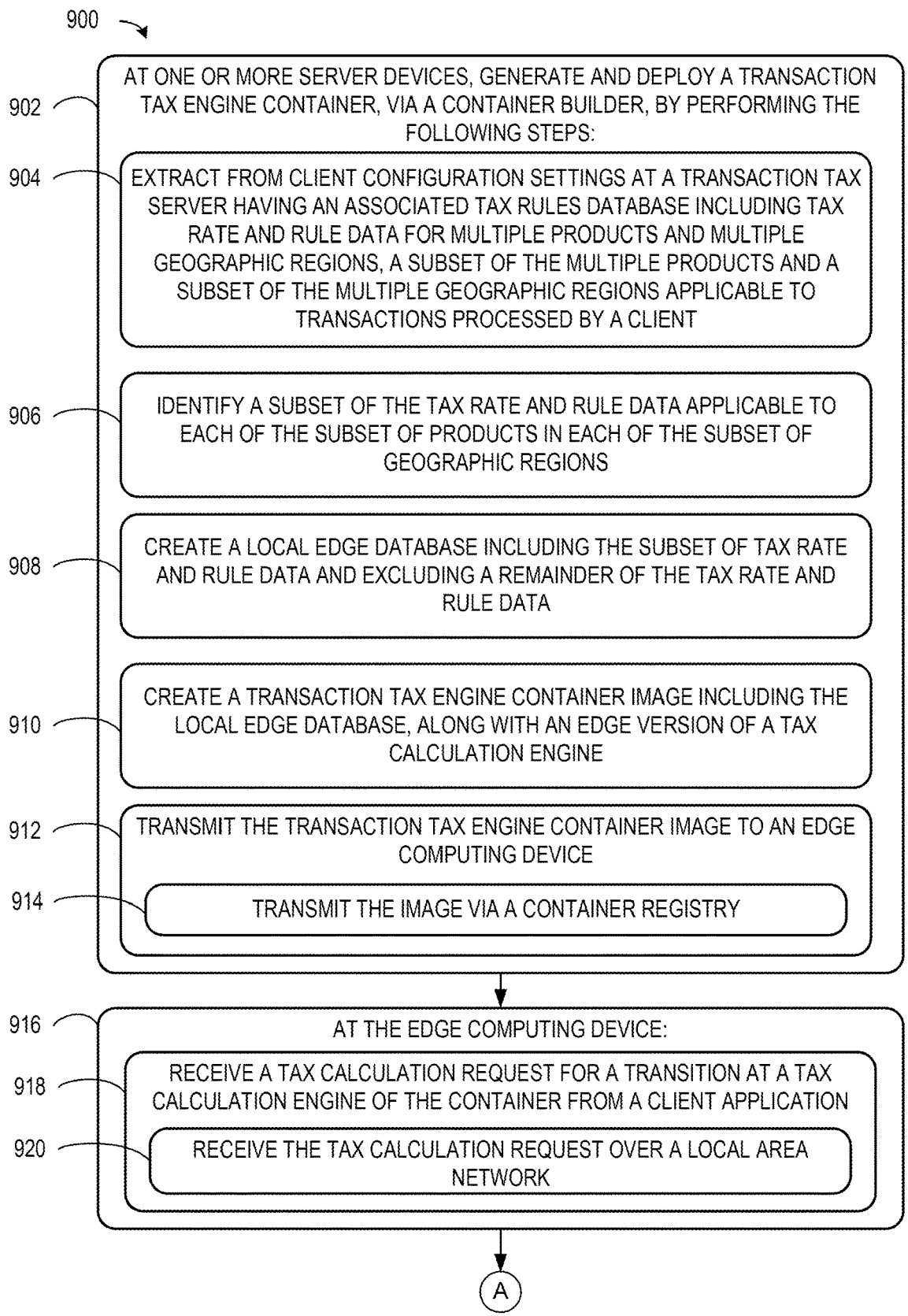
FIGS. 9A-9B show a flow diagram of a method for generating and deploying an edge version of a tax calculation engine, and processing a tax calculation request at the edge version of the tax calculation engine, according to one example of the present disclosure.
Figure 9B:
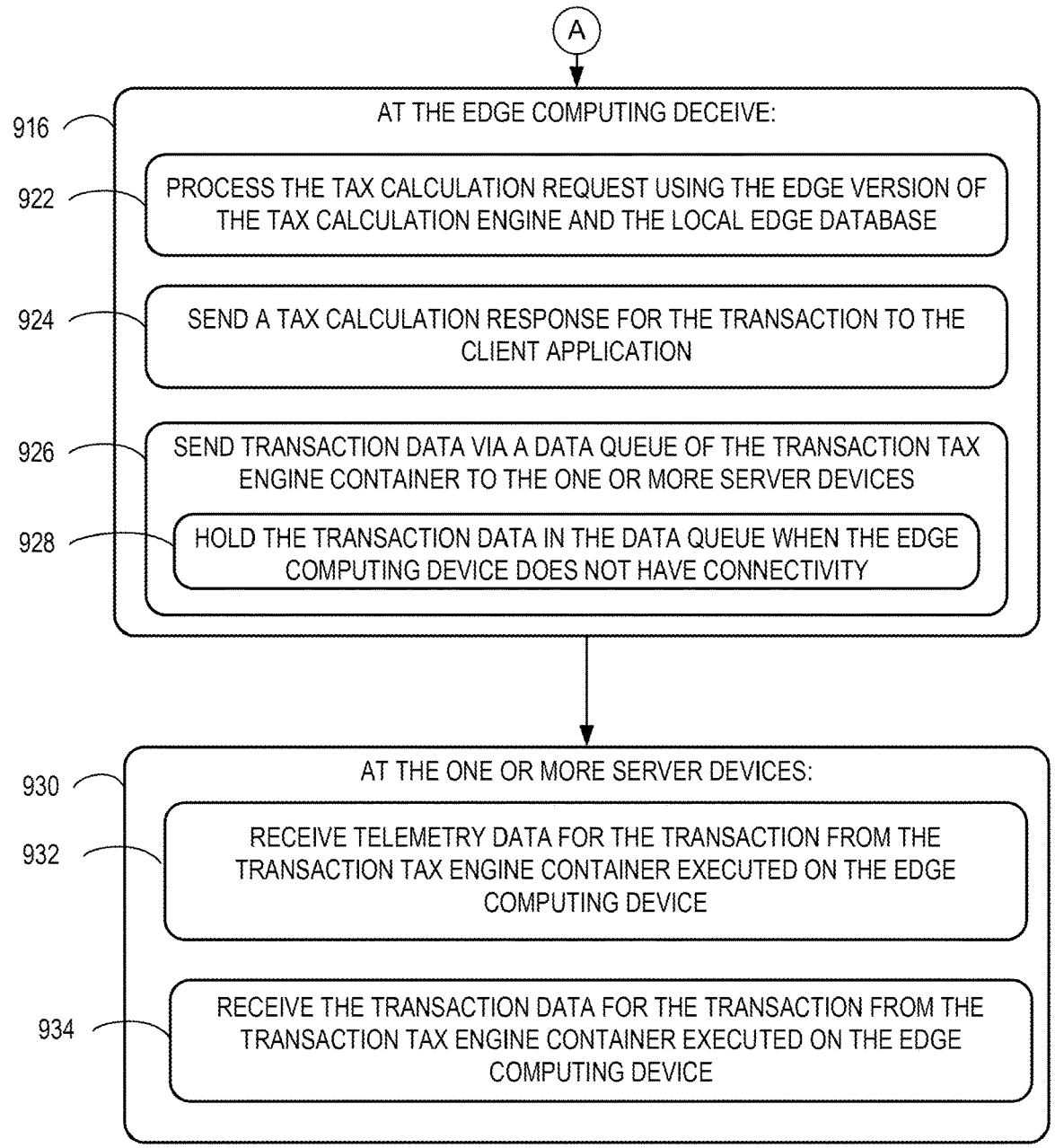

FIGS. 9A-9B show a flow diagram of an example method 900 for generating and deploying an edge version of a tax calculation engine, and processing a tax calculation request at the edge version of the tax calculation engine. Method 900 may be performed on computing system 10 for example. Method 900 comprises, at 902, at one or more server devices, generating and deploying a transaction tax engine container, via a container builder, by performing the following steps. Method 900 comprises, at 904, extracting from client configuration settings at a transaction tax server having an associated tax rules database including tax rate and rule data for multiple products and multiple geographic regions, a subset of the multiple products and a subset of the multiple geographic regions applicable to transactions processed by a client. In some examples, the client may have more than one taxpaying entity and each entity can have a different subset of the multiple products and/or a different subset of the multiple geographical regions. Method 900 comprises, at 906, identifying a subset of the tax rate and rule data applicable to each of the subset of products in each of the subset of geographic regions. Method 900 comprises, at 908, creating a local edge database including the subset of the tax rate and rule data and excluding a remainder of the tax rate and rule data. Method 900 comprises, at 910, creating a transaction tax engine container image including the local edge database, along with an edge version of a tax calculation engine. Method 900 comprises, at 912, transmitting the transaction tax engine container image to an edge computing device. Alternatively or additionally, transmitting the transaction tax engine container image is done via a container registry, as indicated at 914.

Method 900 further comprises the following steps at the edge computing device, as indicated at 916. Method 900 comprises, at 918, receiving a tax calculation request for a transaction at the tax calculation engine of the container from a client application. The tax calculation request includes a product identifier and a geographic region identifier. In some examples, method 900 comprises, at 920, receiving the tax calculation request over a local area network via a calculation API of the transaction tax engine container. Method 900 comprises, at 922, processing the tax calculation request using the edge version of the tax calculation engine and the local edge database. Method 900 comprises, at 924, sending a tax calculation response for the transaction to the client application. Method 900 comprises, at 926, sending transaction data via a data queue of the transaction tax engine container to the one or more server devices. In some examples, method 900 comprises, at 928, holding the transaction data in the data queue when the edge computing device does not have connectivity. In such examples, the transaction data can be sent to the one or more server devices when the edge computing device reconnects.

Method 900 performs the following steps at the one or more server devices, as indicated at 930. Method 900 comprises receiving telemetry data for the transaction from the transaction tax engine container executed on the edge computing device at 932, and receiving the transaction data for the transaction from the transaction tax engine container executed on the edge computing device at 934.

Using the above-described systems and methods, an edge based containerized transaction tax engine can be built, deployed, and executed behind a firewall of a client computer network, to process tax calculation requests from client applications sent over low latency local area network connections, thereby improving response times and decreasing downtime associated with architectures that send tax calculation requests over a wide area network (WAN) such as the internet. This can reduce delays and avoid lost sales through abandoned shopping carts, generally improving the customer experience of the client. Further, the containerized tax calculation engine is built with a sufficiently small footprint, by only including tax rate and rule data related to the geographic regions and products of interest to the client, that it can be executed on computing devices with less memory and processing ability, and still achieve sufficient response times. Such an architecture also has the advantage that fewer tax calculation transactions may fail or time-out, resulting in less tax burden that must be borne by the client due to failure to properly charge tax at the time of the transaction.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
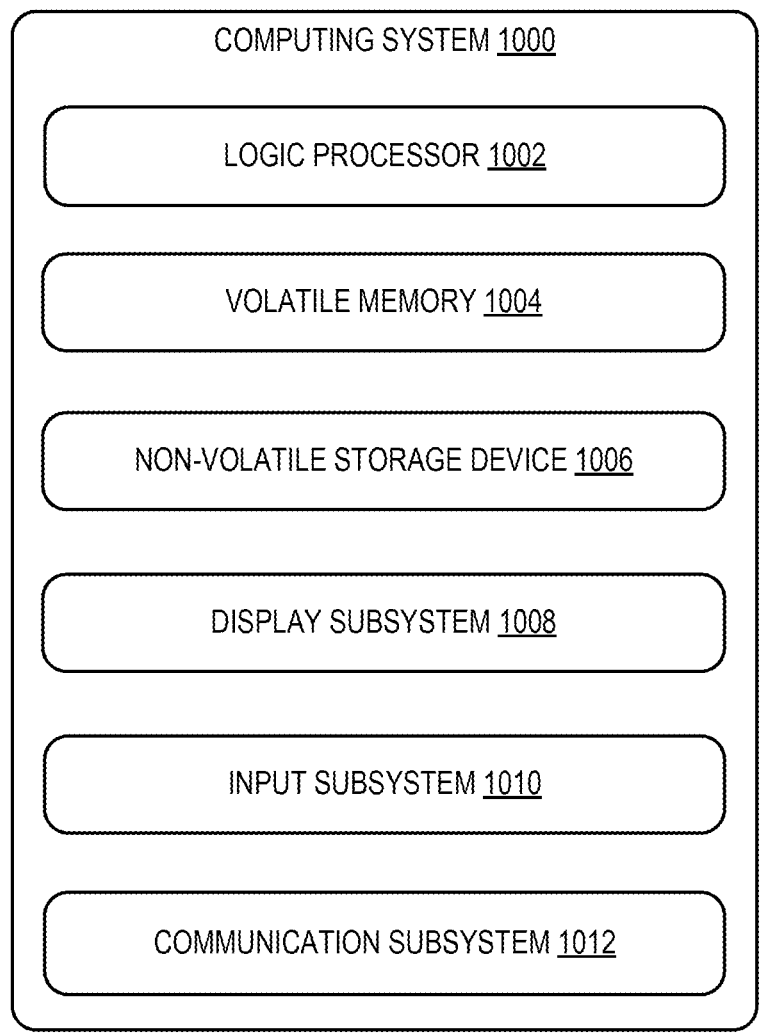
FIG. 10 shows a schematic view of an example computing environment in which the computer system of FIG. 1 may be enacted.

FIG. 10 schematically shows a non-limiting embodiment of a computing system 1000 that can enact one or more of the methods and processes described above. Further, computing system 10 can be enacted on computing system 1000. Computing system 1000 is shown in simplified form. Computing system 1000 may embody the servers and computing devices described above. Computing system 1000 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1000 includes a logic processor 1002 volatile memory 1004, and a non-volatile storage device 1006. Computing system 1000 may optionally include a display subsystem 1008, input subsystem 1010, communication subsystem 1012, and/or other components not shown in FIG. 10.

Logic processor 1002 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1002 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1006 includes one or more physical devices configured to hold instructions executable by the logic processors to implement the methods and processes described herein. When such methods and processes are implemented, the state of non-volatile storage device 1006 may be transformed—e.g., to hold different data.

Non-volatile storage device 1006 may include physical devices that are removable and/or built in. Non-volatile storage device 1006 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1006 may include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Volatile memory 1004 may include physical devices that include random access memory. Volatile memory 1004 is typically utilized by logic processor 1002 to temporarily store information during processing of software instructions. It will be appreciated that volatile memory 1004 typically does not continue to store instructions when power is cut to the volatile memory 1004.

Aspects of logic processor 1002, volatile memory 1004, and non-volatile storage device 1006 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 typically implemented in software by a processor to perform a particular function using portions of volatile memory, which function involves transformative processing that specially configures the processor to perform the function. Thus, a module, program, or engine may be instantiated via logic processor 1002 executing instructions held by non-volatile storage device 1006, using portions of volatile memory 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1008 may be used to present a visual representation of data held by non-volatile storage device 1006. The visual representation may take the form of a graphical user interface (GUI). As the herein described methods and processes change the data held by the non-volatile storage device, and thus transform the state of the non-volatile storage device, the state of display subsystem 1008 may likewise be transformed to visually represent changes in the underlying data. Display subsystem 1008 may include one or more display devices utilizing virtually any type of technology. Such display devices may be combined with logic processor 1002, volatile memory 1004, and/or non-volatile storage device 1006 in a shared enclosure, or such display devices may be peripheral display devices.

When included, input subsystem 1010 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1012 may be configured to communicatively couple various computing devices described herein with each other, and with other devices. Communication subsystem 1012 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1000 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A server-side computing system, comprising:
a transaction tax server including:
an associated global tax rules database including tax rate and rule data for a global list of geographic regions and a global list of products, and
client configuration settings having a client-specified selection of products from the global list of products and a client-specified selection of geographic regions from the global list of geographic regions involved in transactions for a client;
a container builder configured to generate and deploy a transaction tax engine container by:
extracting from the client configuration settings at the transaction tax server a subset of multiple products and a subset of multiple geographic regions applicable to the transactions processed by the client;
identifying a subset of the tax rate and rule data from the associated global tax rules database that are applicable to the subset of multiple products in each geographic region of the subset of multiple geographic regions;
creating a local edge database including the subset of tax rate and rule data and excluding a remainder of the tax rate and rule data in the associated global tax rules database;
creating a transaction tax engine container image including the local edge database, along with an edge version of a tax calculation engine, the edge version of the tax calculation engine being configured to, at an edge computing device, determine a tax calculation response based at least upon the subset of tax rate and rule data of the local edge database; and
transmitting the transaction tax engine container image to a plurality of the edge computing devices for creating an instance of the transaction tax engine container on each of the plurality of the edge computing devices.

2. The computing system of claim 1, further comprising a transaction log server configured to receive transaction data from the transaction tax engine container executed on the edge computing device.

3. The computing system of claim 2, wherein the transaction data includes one or more of a date of a transaction, a product purchased or sold, quantities, or amounts.

4. The computing system of claim 1, further comprising a container manager configured to receive telemetry data from the transaction tax engine container executed on the edge computing device.

5. The computing system of claim 1, wherein the image of the transaction tax engine further includes a calculation application programming interface for the tax calculation engine.

6. The computing system of claim 1, wherein the image of the transaction tax engine further includes a persistence interface to facilitate communication between the local edge database and the tax calculation engine.

7. The computing system of claim 1, wherein the edge version of the tax calculation engine is configured to calculate an applicable tax amount or tax rate for a transaction in response to receiving a tax calculation request.

8. A server-side computing method, comprising:
generating and deploying a transaction tax engine container, via a container builder, by:
extracting from client configuration settings at a transaction tax server a subset of multiple products for a client-specified selection from a global list of products and a subset of multiple geographic regions for a client-specified selection from a global list of geographic regions involved in transactions for a client;
identifying a subset of tax rate and rule data from an associated global tax rules database including the tax rate and rule data for the global list of products and the global list of geographic regions that are applicable to each of the subset of multiple products in each geographic region of the subset of multiple geographic regions;

creating a local edge database including the subset of tax rate and rule data and excluding a remainder of the tax rate and rule data in the associated global tax rules database;

creating an image of the transaction tax engine container including the local edge database, along with an edge version of a tax calculation engine, the edge version of the tax calculation engine being configured to, at an edge computing device, determine a tax calculation response based at least upon the subset of tax rate and rule data of the local edge database; and transmitting the image of the transaction tax engine container to a plurality of the edge computing devices for creating an instance of the transaction tax engine container on each of the edge computing devices.

9. The method of claim 8, further comprising receiving transaction data from the transaction tax engine container executed on the edge computing device.

10. The method of claim 8, further comprising receiving telemetry data from the transaction tax engine container executed on the edge computing device.

11. The method of claim 8, wherein the transaction tax engine container further includes a calculation application programming interface for the tax calculation engine.

12. The method of claim 8, wherein the transaction tax engine container further includes a persistence interface to facilitate communication between the local edge database and the tax calculation engine.

13. The method of claim 8, wherein transmitting the image of the transaction tax engine container includes transmitting the image via a container registry.

14. A client- and server-side computing method, comprising:

at one or more server devices:
generating and deploying a transaction tax engine container, via a container builder, by:
extracting from client configuration settings at a transaction tax server a subset of multiple products for a client-specified selection from a global list of products and a subset of multiple geographic regions for a client-specified selection from a global list of geographic regions involved in transactions for a client;

identifying a subset of tax rate and rule data from an associated global tax rules database including the tax rate and rule data for the global list of products and the global list of geographic regions that are applicable to each of the subset of multiple products in each geographic region of the subset of multiple geographic regions;

creating a local edge database including the subset of tax rate and rule data and excluding a remainder of the tax rate and rule data in the associated global tax rules database;

creating a transaction tax engine container image including the local edge database, along with an edge version of a tax calculation engine, the edge version of the tax calculation engine being configured to, at an edge computing device, determine a tax calculation response based at least upon the subset of tax rate and rule data of the local edge database; and transmitting the transaction tax engine container image to a plurality of the edge computing devices located across the subset of multiple geographic regions;

at each of the edge computing devices:
creating an instance of the transaction tax engine container;

receiving a tax calculation request for a transaction at the tax calculation engine of the container from a client application, the tax calculation request including a product identifier and a geographic region identifier;

processing the tax calculation request using the edge version of the tax calculation engine and the local edge database; and sending the tax calculation response for the transaction to the client application.

15. The method of claim 14, further comprising at the one or more server devices, receiving telemetry data for the transaction from the transaction tax engine container executed on the edge computing device.

16. The method of claim 14, further comprising at the one or more server devices, receiving transaction data for the transaction from the transaction tax engine container executed on the edge computing device.

17. The method of claim 14, further comprising at the edge computing device, sending transaction data via a data queue of the transaction tax engine container to the one or more server devices.

18. The method of claim 17, further comprising holding the transaction data in the data queue when the edge computing device does not have connectivity.

19. The method of claim 14, wherein the transaction tax engine container further includes a calculation application programming interface for the tax calculation engine, and a persistence interface to facilitate communication between the local edge database and the tax calculation engine.

20. The method of claim 19, wherein receiving the tax calculation request from the client application includes receiving the tax calculation request over a local area network via the calculation application programming interface.

* * * * *

UNITED STATES PATENT AND TRADEMARK OFFICE
CERTIFICATE OF CORRECTION

PATENT NO. : 12,260,437 B2
APPLICATION NO. : 17/660295
DATED : March 25, 2025
INVENTOR(S) : Eric Christian et al.

Page 1 of 1

It is certified that error appears in the above-identified patent and that said Letters Patent is hereby corrected as shown below:

In the Claims

In Column 13, Line 1, delete "to each of"

In Column 13, Line 52, delete "to each of"

Signed and Sealed this
Fifteenth Day of July, 2025

Coke Morgan Stewart
*Acting Director of the United States Patent and Trademark Office*